US011354245B2

(12) United States Patent
Kast et al.

(10) Patent No.: US 11,354,245 B2
(45) Date of Patent: *Jun. 7, 2022

(54) SYSTEMS AND METHODS FOR PREFETCHING CONTENT ITEMS

(71) Applicant: GOOGLE LLC, Mountain View, CA (US)

(72) Inventors: Anton Kast, Mountain View, CA (US); William Coster, Mountain View, CA (US); Anurag Agrawal, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/792,680

(22) Filed: Feb. 17, 2020

(65) Prior Publication Data

US 2020/0183845 A1   Jun. 11, 2020

Related U.S. Application Data

(63) Continuation of application No. 16/091,751, filed as application No. PCT/US2017/065843 on Dec. 12, (Continued)

(30) Foreign Application Priority Data

Dec. 12, 2016   (WO) ............... PCT/US2016/066415

(51) Int. Cl.
*G06F 12/0862*   (2016.01)
*G06F 16/957*   (2019.01)
(Continued)

(52) U.S. Cl.
CPC .......... *G06F 12/0862* (2013.01); *G06F 9/485* (2013.01); *G06F 9/5083* (2013.01);
(Continued)

(58) Field of Classification Search
CPC ..... G06F 12/0862; G06F 16/957–9577; G06F 2212/1024; G06F 2213/0064; G06F 9/485; G06F 9/5083; G06F 12/0891; G06F 16/40

See application file for complete search history.

(56) References Cited

U.S. PATENT DOCUMENTS 6,675,202 B1   1/2004   Perttunen
8,984,091 B1   3/2015   Popescu et al.
(Continued)

FOREIGN PATENT DOCUMENTS

CN   101460945   6/2009
CN   105095107   11/2015
(Continued)

OTHER PUBLICATIONS

International Search Report and Written Opinion for PCT/US2016/066415 dated Aug. 3, 2017(17 pages).
(Continued)

*Primary Examiner* — Nicholas J Simonetti
(74) *Attorney, Agent, or Firm* — Marshall, Gerstein & Borun LLP

(57) ABSTRACT

Systems and methods for prefetching content items for display by applications executed on computing devices are provided. The method can include transmitting a first request for content to display within an environment of the application, the first request for content including a first parameter to be used to determine a first content item for display; storing in an associated memory element, the first parameter; transmitting a follow-on request for content including the first parameter of the first request for content; receiving a follow-on content item responsive to the follow-on request for content; storing the follow-on content item in a local cache structure specific to the application; transmitting a second request for content; retrieving, in response to the
(Continued)

second request, the follow-on content item from the local cache structure; and displaying, in response to the second request, the follow-on content item within the environment of the application on the computing device.

20 Claims, 5 Drawing Sheets

Related U.S. Application Data 2017, now Pat. No. 10,565,118, which is a continuation of application No. PCT/US2016/066415, filed on Dec. 13, 2016.

(51) Int. Cl.

| | | |
|---|---|---|
| *G06F 16/40* | (2019.01) | |
| *G06F 9/48* | (2006.01) | |
| *G06F 9/50* | (2006.01) | |
| *G06F 12/0891* | (2016.01) | |

(52) U.S. Cl.
CPC .......... *G06F 12/0891* (2013.01); *G06F 16/40* (2019.01); *G06F 16/9574* (2019.01)

(56) References Cited

U.S. PATENT DOCUMENTS

| | | | |
|---|---|---|---|
| 9,607,097 B2 | 3/2017 | Chan | |
| 10,867,119 B1* | 12/2020 | Karppanen | ........... G06F 40/146 |
| 2003/0093488 A1 | 5/2003 | Yoshida et al. | |
| 2008/0104194 A1 | 5/2008 | Tsun et al. | |
| 2009/0182941 A1 | 7/2009 | Turk | |
| 2012/0323680 A1* | 12/2012 | Zhou | ................... G06F 16/9577 |
| | | | 705/14.49 |
| 2013/0159383 A1 | 6/2013 | Tuliani et al. | |
| 2018/0068347 A1* | 3/2018 | Fernandes | ........... G06F 16/9574 |

FOREIGN PATENT DOCUMENTS

| | | |
|---|---|---|
| KR | 10-2007-0101237 | 10/2007 |
| KR | 10-2009-0125108 | 12/2009 |
| KR | 10-2016-0083675 | 7/2016 |
| WO | WO-2012/107341 A2 | 8/2012 |
| WO | WO-2015/188100 A1 | 12/2015 |

OTHER PUBLICATIONS

International Search Report and Written Opinion for PCT/US2017/065843 dated Mar. 1, 2018 (17 pages).
Notice of Allowance for U.S. Appl. No. 16/091,751 dated Oct. 9, 2019 (11 pages).
Office Action for KR Appln. Ser. No. 10-2018-7025143 dated Dec. 26, 2019 (19 pages).
Preliminary Report on Patentability, Ch. I, PCT Appln. Ser. No. for PCT/US2016/066415 dated Jun. 27, 2019 (11 pages).
Office Action for CN Appln. Ser. No. 201780014547.9 dated May 27, 2021 (11 pages).

* cited by examiner

SYSTEMS AND METHODS FOR PREFETCHING CONTENT ITEMS

RELATED APPLICATIONS

This application claims priority to and is a continuation of U.S. patent application Ser. No. 16/091,751, filed Oct. 5, 2018 titled "SYSTEMS AND METHODS FOR PREFETCHING CONTENT ITEMS" which in turn is a National Stage Application under 35 U.S.C. § 371 of International Patent Application No. PCT/US2017/65843, filed Dec. 12, 2017 titled "SYSTEMS AND METHODS FOR PREFETCHING CONTENT ITEMS," which in turn claims the benefit of and priority of P.C.T. Application No. PCT/US2016/066415, filed Dec. 13, 2016, titled "SYSTEMS AND METHODS FOR PREFETCHING CONTENT ITEMS," each of which is hereby incorporated by reference herein in their entirety.

BACKGROUND

In a computer networked environment such as the internet, third-party content providers provide third-party content items for display on end-user computing devices. These third-party content items can be displayed on a web page or in an application associated with a respective publisher. These third-party content items can include content identifying the third-party content provider that provided the content item.

SUMMARY

At least one aspect is directed to a method for prefetching content items, e.g. dynamically loaded content items, for display by applications executed on client computing devices, the method including transmitting, by an application executing on a computing device including one or more data processors, a first request for content to display within an environment of the application, the first request for content including a first parameter to be used to determine a first content item for display. The method can further include storing, by the computing device, in an associated memory element, the first parameter. The method can further include receiving, by the computing device, the first content item. The method can further include displaying, by the computing device, the first content item, e.g. in a first content slot, within the environment of the application executing on the computing device. The method can further include retrieving, by the computing device, responsive to displaying the first content item, from the memory element, the first parameter of the first request for content. The method can further include transmitting, by the computing device to the server, a follow-on request for content including the retrieved first parameter of the first request for content. The method can further include receiving, by the computing device, a follow-on content item responsive to the follow-on request for content. The method can further include storing, by the computing device, the follow-on content item in a local cache structure specific to the application. The method can further include transmitting, by the computing device, a second request for content to display within the environment of the application, the second request for content including a second parameter to be used to determine a second content item for display. The method can further include retrieving, by the computing device, in response to the second request, the follow-on content item from the local cache structure. The method can further include displaying, by the computing device, in response to the second request, the follow-on content item, e.g. in a second content slot, within the environment of the application on the computing device. In some implementations, the first parameter includes an indication of at least one of a location of the computing device or a network connection type used by the computing device.

In some implementations, the follow-on request for content is transmitted responsive to display of the first content item on the computing device ending. In some implementations, the first content item is deleted responsive to the display of the first content item on the computing device ending. In some implementations, the follow-on content item is assigned an expiration time, and the follow-on content item is retrieved from the local cache structure and displayed only if the follow-on content item has not expired. In some implementations, the expiration time is configurable by a user. In some implementations, the first content item is different from the follow-on content item.

In some implementations, the method further includes transmitting, by the computing device to the server, an initial request for an initial content item when the application is launched, the initial request for the initial content item including an initial parameter to be used by the server to determine the initial content item. The method can further include receiving, by the computing device from the server, the initial content item. The method can further include storing, by the computing device, the initial content item in the local cache structure. The method can further include retrieving, by the computing device, in response to an initial request to display content after the application is launched, the initial content item from the local cache structure. The method can further include displaying, by the computing device, the initial content item within the environment of the application on the computing device.

In some implementations, the local cache structure is maintained when the application is closed. In some implementations, the local cache structure includes a plurality of caches which are classified according to parameters included in requests for content items sent by the application to the server, and wherein the follow-on content item is stored in one of the plurality of caches which is classified according to the first parameter included in the follow-on request for content. In some implementations, the local cache structure includes only one local cache.

In some implementations, the local cache structure is saved persistently on the computing device such that content items stored in the local cache structure are available to the application after relaunching the application. In some implementations, the application is configured to support display of a plurality of content items on a display page, each content item is displayed through a content item slot, and each content item slot is assigned a separate local cache structure.

At least one aspect is directed to a system for prefetching content items, e.g. dynamically loaded content items, for display by applications executed on client computing devices. The system can include a processor and a memory coupled to the processor. The memory can store computer-executable instructions, which when executed by the processor, cause the processor to transmit a first request for content to display within an environment of the application, the first request for content including a first parameter to be used to determine a first content item for display. The computer-executable instructions, when executed by the processor, can further cause the processor to store, in an associated memory element, the first parameter. The computer-executable instructions, when executed by the processor, can further cause the processor to receive the first content item. The computer-executable instructions, when executed by the processor, can further cause the processor to display the first content item, e.g. in a first content slot, within the environment of the application executing on the computing device. The computer-executable instructions, when executed by the processor, can further cause the processor to retrieve, responsive to displaying the first content item, from the memory element, the first parameter of the first request for content. The computer-executable instructions, when executed by the processor, can further cause the processor to transmit a follow-on request for content including the retrieved first parameter of the first request for content. The computer-executable instructions, when executed by the processor, can further cause the processor to receive a follow-on content item responsive to the follow-on request for content. The computer-executable instructions, when executed by the processor, can further cause the processor to store the follow-on content item in a local cache structure specific to the application. The computer-executable instructions, when executed by the processor, can further cause the processor to transmit a second request for content to display within the environment of the application. The second request for content can include a second parameter to be used to determine a second content item for display. The computer-executable instructions, when executed by the processor, can further cause the processor to retrieve, in response to the second request, the follow-on content item from the local cache structure. The computer-executable instructions, when executed by the processor, can further cause the processor to display, in response to the second request, the follow-on content item, e.g. in a second content slot, within the environment of the application on the computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. It will be appreciated that aspects and implementations can be combined and features described in the context of one aspect or implementation can be implemented in the context of other aspects.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
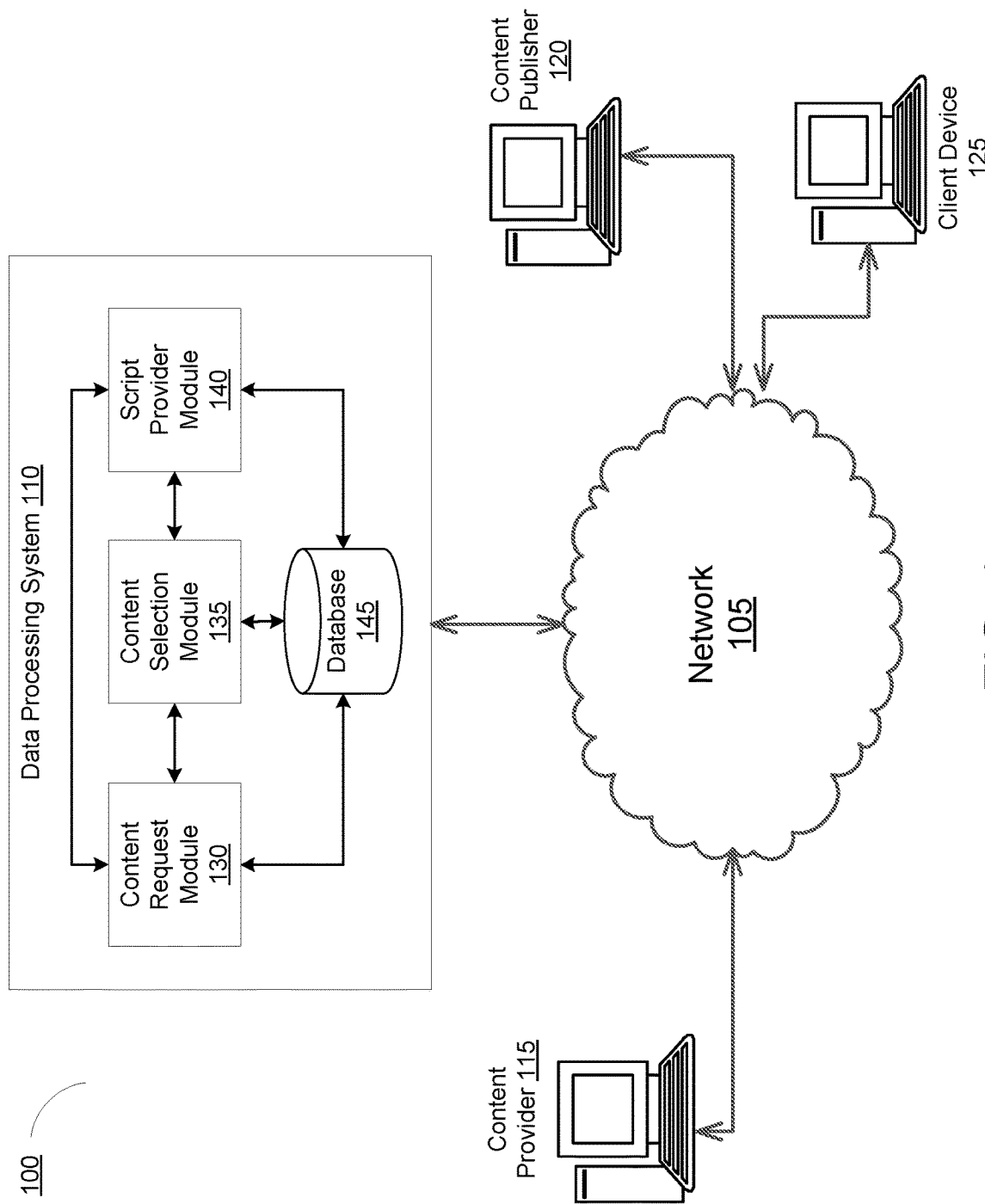
FIG. 1 is a block diagram depicting an example of an environment for prefetching content items for display according to some embodiments.

Following below are more detailed descriptions of various concepts related to, and embodiments of, methods, apparatuses, and systems for prefetching content items for display by applications executed on computing devices. The various concepts introduced above and discussed in greater detail below may be implemented in any of numerous ways, as the described concepts are not limited to any particular manner of implementation.

The present disclosure relates to techniques for low-latency display of dynamically loaded content items within a display page of an application running on a computing device. In particular, the present disclosure relates to techniques for prefetching content items for display in a content slot of an application executed on a computing device by causing the application to prefetch content for the content slot using request parameters of a previous content slot, storing the prefetched content in a local cache of the application and retrieving the prefetched content from the local cache responsive to an indication to insert content in the content slot. In some implementations, the content slots include computer executable codes.

Within mobile applications executing on portable computing devices, dynamically loaded content items, such as images, videos, or other displayable content, are typically embedded inside the display page to achieve a certain look and feel consistent with other content items on the display page of the application (e.g., native content items shown in a news feed, alongside an interactive user interface portion of an application, or the like). In other examples, dynamically loaded content items may be inserted at logical breaks while a user is using an application and may take over the entire screen or overlay the application's regular user interface. In any of these cases, it is important that the content items are rendered with as little delay as possible. For example, when a user navigates to a different part of a feed where a content item has not yet been loaded, the content item should be rendered as soon as possible in order to avoid any adverse effect on the user experience. The same applies to overlaid or interstitial content items for which a broken user experience can occur when a blank screen portion is shown for some time. Due to slow and high latency data connections (e.g., for mobile low-powered devices) technical constraints are present that make the fast rendering of dynamically loaded data items on mobile communication devices challenging.

A technical problem of the present disclosure is therefore to provide a technique for reducing the delay or latency of the display of dynamically loaded content items within applications running on mobile computing devices.

The present disclosure addresses these challenges by requesting a second content item after a first content item is finished playing or after the first content item has rendered, so that the second content item can be cached locally at the mobile device for quick retrieval and rendering when needed. In requesting the second content item, parameters (e.g., location, time of day, whether the device is connected via a cellular network or via WiFi, parameters associated with a previous content slot, etc.) associated with a request for the first content item are repeated in requesting the second content item. When an application later determines a need for a content item (e.g., responsive to detecting a content slot in the application), the application may retrieve the locally cached second content item, instead of going through the relatively long process of requesting the second content item from a content server.

FIG. 1 is a block diagram depicting one implementation of an environment for prefetching content items for display by an application executed on a computing device. The environment 100 includes at least one data processing system 110. The data processing system 110 can include at least one processor (or a processing circuit) and a memory. The memory stores processor-executable instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language. The data processing system 110 can include one or more computing devices or servers that can perform various functions. In some implementations, the data processing system 110 can include a content selection system configured to host selections of content. In some implementations, the data processing system 110 does not include the content selection system but is configured to communicate with the content selection system via the network 105.

The network 105 can include computer networks such as the internet, local, wide, metro or other area networks, intranets, satellite networks, other computer networks such as voice or data mobile phone communication networks, and combinations thereof. The data processing system 110 of the environment 100 can communicate via the network 105, for instance with at least one content provider computing device 115, at least one content publisher computing device 120, or at least one client device 125. The network 105 may be any form of computer network that relays information between the client device 125, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 can also include any number of computing devices (e.g., computer, servers, routers, network switches, etc.) that are configured to receive and/or transmit data within network 105. The network 105 can further include any number of hardwired and/or wireless connections. For example, the client device 125 can communicate wirelessly (e.g., via WiFi, cellular, radio, etc.) with a transceiver that is hardwired (e.g., via a fiber optic cable, a CAT5 cable, etc.) to other computing devices in network 105.

The content provider computing device 115 can include servers or other computing devices operated by a content provider entity to provide content items such as content for display on information resources at the client device 125. The content provided by the content provider computing device 115 can include third-party content items or creatives for display on information resources, such as a website or web page that includes primary content, e.g., content provided by the content publisher computing device 120. The content items can also be displayed on a search results web page. For instance, the content provider computing device 115 can provide or be the source of other content items for display in content slots of content web pages, such as a web page of a company where the primary content of the web page is provided by the company, or for display on a search results landing page provided by a search engine, or within an information feed. The content items associated with the content provider computing device 115 can be displayed on information resources other than web pages, such as content displayed as part of the execution of an application (such as a gaming application, global positioning system (GPS) or map application or other types of applications) on a smartphone or other client device 125.

The content publisher computing device 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items from the content provider computing device 115. For instance, the content publisher computing device 120 can operate the web site of a company and can provide content about that company for display on web pages of the website. The web pages can include content slots configured for the display of third-party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The client device 125 can include computing devices configured to communicate via the network 105 to display data such as the content provided by the content publisher computing device 120 (e.g., primary web page content or other information resources) and the content provided by the content provider computing device 115 (e.g., third party content items configured for display in a content slot of a web page). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 125 can be communication devices through which an end-user can submit requests to receive content. The requests can be requests to a search engine and the requests can include search queries. In some implementations, the requests can include a request to access a web page.

The content provider computing device 115, the content publisher computing device 120 and the client device 125 can include a processor and a memory, i.e., a processing circuit. The memory stores machine instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language.

The content provider computing device 115, the content publisher computing device 120, and the client device 125 can also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices can be internal to a housing of the content provider computing device 115, the content publisher computing device 120 and the client device 125 (e.g., a built-in display, microphone, etc.) or external to the housing of content provider computing device 115, the content publisher computing device 120 and the client device 125 (e.g., a monitor connected to the user computing device 115, a speaker connected to the user computing device 115, etc.), according to various implementations. For example, the content provider computing device 115, the content publisher computing device 120 and the client device 125 can include an electronic display, which visually displays web pages using webpage data received from one or more content sources and/or from the data processing system 110 via the network 105. In some implementations, a content placement campaign manager or third-party content provider can communicate with the data processing system 110 via the content provider computing device 115. In some implementations, the third-party content provider can communicate with the data processing system 110 via a user interface displayed on the user interface devices of the content provider computing device 115.

The data processing system 110 can include at least one server. For instance, the data processing system 110 can include a plurality of servers located in at least one data center or server farm. In some implementations, the data processing system 110 can include a third-party content placement system, e.g., an ad server or ad placement system. The data processing system 110 can include at least one content request module 130, at least one content selection module 135, at least one script provider module 140 and at least one database 145. The content request module 130, the content selection module 135 and the script provider module 140 each can include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the client device 125) via the network 105.

The content request module 130, the content selection module 135, and the script provider module 140 can include or execute at least one computer program or at least one script. The content request module 130, the content selection module 135, and the script provider module 140 can be separate components, a single component, or part of the data processing system 110. The content request module 130, the content selection module 135, and the script provider module 140 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include web pages, portions of webpages, third-party content items, and a prefetching script, among others, to serve to a client device 125.

The prefetching script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JavaScript, among others. The computer-executable instructions can be executed within an application of the client device 125, such as the application that caused the client device 125 to transmit the request for content received by the content request module 130. The application can include, for example, an Internet browser, a mobile application, a gaming application, a GPS application, or any other computer program capable of reading and executing the computer-executable instructions.

In some implementations, the prefetching script is configured to cause the client device 125 to prefetch content items from the data processing system 110 for local storage at the client device 125 for subsequent use. For example, the prefetching script can cause the client device 125 to create one or more local caches on the client device. The prefetching script can cause the client device 125 to generate one or more requests for content. The prefetching script can cause the client device 125 to receive content in response to the requests for content and store the received content in the generated local caches. The prefetching script can cause the client device 125 to, responsive to identifying a content slot in the application, generate a subsequent request for content and retrieve, from the local cache, a content item for insertion into the content slot. In some implementations, the content items stored in the local cache are stored to serve in subsequent content slots.

Figure 2:
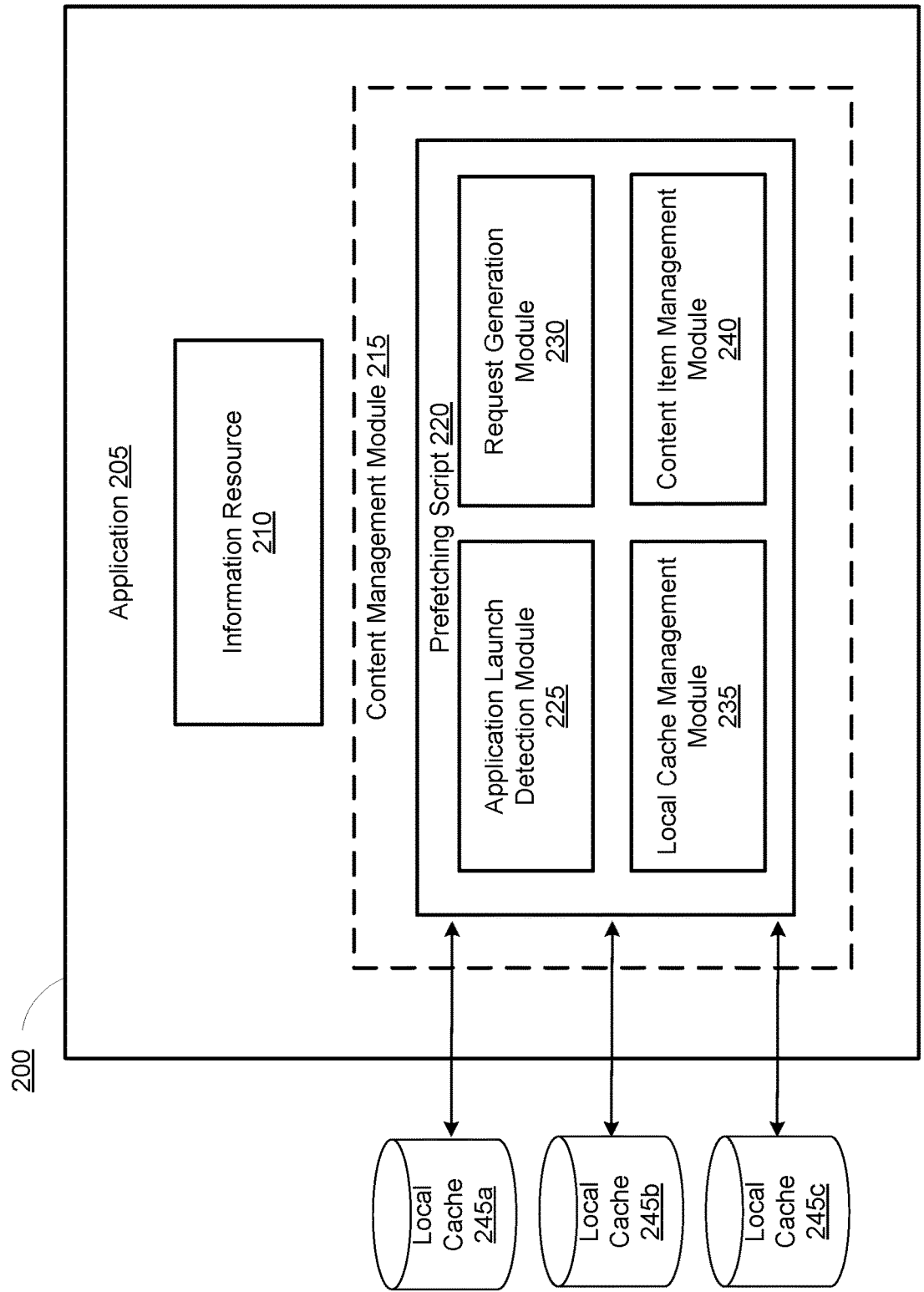
FIG. 2 is a block diagram depicting an example for prefetching content items for display according to some embodiments.

In some implementations, the prefetching script can include computer-executable instructions, when executed by a processor of the client device 125, can cause an application of the client device to: (a) transmit a first request for content to display within an environment of the application, the first request for content including a first parameter to be used to determine a first content item for display, (b) store, in an associated memory element, the first parameter, (c) receive the first content item, (d) display the first content item within the environment of the application executing on the computing device, (e) retrieve, responsive to displaying the first content item, from the memory element, the first parameter of the first request for content, (f) transmit a follow-on request for content including the retrieved first parameter of the first request for content, (g) receive a follow-on content item responsive to the follow-on request for content, (h) store the follow-on content item in a local cache structure specific to the application, (i) transmit a second request for content to display within the environment of the application, the second request for content can include a second parameter to be used to determine a second content item for display, (j) retrieve, in response to the second request, the follow-on content item from the local cache structure, and (k) display, in response to the second request, the follow-on content item within the environment of the application on the computing device. Additional details relating to the prefetching script are provided further herein in relation to FIGS. 2, 3, and 4. One example of a system in relation to the prefetching script is shown in FIG. 2.

The content request module 130 can receive a request for content from the client device 125. The request for content can include a request for an information resource, a request for one or more third-party content items, a request for a script (e.g., a prefetching script) or a combination thereof. In some implementations, the request for content can include a request for third-party content. In some implementations, the request for third-party content can include an address or identifier of an information resource on which the third-party content is to be displayed. The request for third-party content can also include or identify one or more parameters that can be used by the data processing system 110 to determine the content to provide in response to the request for content. For example, the parameters can identify a size of a content slot within which to insert the requested content. The parameters can identify a type of content associated with the information resource, a type of third-party content requested (e.g., text, image, video, etc.), client device information, size information for requested third-party content item, a network type associated with the client device 125 (e.g., cellular network, WiFi, etc.), an application ID associated with an application at the client device 125, attributes associated with the application ID (e.g., device settings, type of client device, etc.), a current or past location of the client device 125, or a combination thereof. In some implementations, the request can identify a script, such as a prefetching script.

In some implementations, the request for content can include a request for an information resource. The request for an information resource can include an address or identifier of the information resource. For example, the request for the information resource can include a URL of a specific resource such as a webpage (e.g., "http://www.example.com"). The request for information resource can also include client device information (such as a device type, device identifier or a combination thereof).

The content selection module 135 can be configured to determine content to be transmitted to the client device 125 in response to a received request for content. The content selection module 135 can determine the content to be sent to the client device 125 based on information or parameters included in the request for content. For instance, upon receiving a request for an information resource, the content selection module 135 can use the address or identifier of the information resource in the request for content to determine the content to send to the client device. In the case of receiving a request for one or more third-party content items, the content selection module 135 can select the third-party content item(s) based on an address or identifier for the information resource on which the third-party content item is to be presented, content type information (e.g., sports, news, music, movies, travel, etc.) for the information resource, size information of the slot(s) in which the third-party content item(s) is/are to be displayed, client device information (e.g., device type, device identifier, device location, etc.), a type of content associated with the information resource, a type of third-party content requested (e.g., text, image, video, etc.), a network type associated with the client device 125 (e.g., cellular network, WiFi, etc.), a user ID associated with an application at the client device 125, attributes associated with the client ID (e.g., device settings, type of client device, etc.), a current or past location of the client device 125, or a combination thereof. In some implementations, the content selection module 135 can communicate with a content selection system and provide the content selection system information included in the request for third-party content received from the client device. The content selection module 135 can also receive one or more third-party content items from the content selection system responsive to providing the information included in the request for third-party content. In some implementations, the content selection module 135 can access the database 145 and retrieve the content for sending to the client device 125.

In some implementations, the content selection module 135 can be configured to determine whether or not a script is to be sent to the client device 125 in response to the request for content. The content selection module 135 can determine whether or not a script is to be sent to the client device 125 based on the type of the request for content (e.g., a request for an information resource, a request for third-party content or a request for a prefetching script), an indicator in the request for content (e.g., an indicator indicative of a prefetching script), an information resource identifier in the request for content or a combination thereof.

In some implementations, the request for content can include a request for content. The request for content can be generated at a client device responsive to detecting a content slot including instructions to request content. The request for content can include an identifier. In some implementations, the device identifier can be unique to a particular application and as such, may be a unique identifier assigned to a particular application installed on a particular client device. In some implementations, the identifier can be a device identifier that uniquely identifies the computing device from which the request was received.

In some implementations, the content selection module 135 can receive the request for content including the identifier and determine whether to send a prefetching script using the identifier. The content selection module 135 can maintain a database including information of applications or devices that have received the prefetching script. The content selection module 135 can use the identifier included in the request and perform a lookup in the database using the identifier to determine whether the application or the device has previously received the prefetching script. The content selection module 135 or the script provider module 140 can update the database to update the information of applications or devices that have received the prefetching script responsive to transmitting the prefetching script to the client device on which the application is executing.

Upon determining that a script is to be sent to the client device 125, the content selection module 135 can forward the request for content or an indication to provide the prefetching script to the client device to the script provider module 140. In some implementations, the content selection module 135 can select a third-party content item to send to the client device 125 along with a script, such as the prefetching script.

The script provider module 140 can be configured to receive an indication to provide the prefetching script and transmit the prefetching script to the client device 125 (or to another entity for sending to the client device 125). The script provider module 140 can maintain the prefetching script in a memory element. The script provider module 140 can determine the client device and/or the application from which the request was received to select a compatible version of the prefetching script to provide to the client device. In some implementations, the prefetching script may be specific to a particular application or may be specific to a particular operating system executing on client devices. The script provider module 140 can select the appropriate prefetching script based on the application and/or client device to which to send the prefetching script.

In some implementations, the prefetching script can be transmitted to the client device 125 separately or together with a third-party content item. For instance, the script provider module 140, the content selection module 135 or another entity of the data processing system 110 can include the prefetching script into the third-party content item before sending the third-party content item to the client device 125. In some implementations, the script provider module 140, the content selection module 135 or another entity of the data processing system 110 can send the prefetching script together with a requested information resource to the client device 125.

FIG. 2 is a block diagram depicting an example of a system 200 for prefetching content according to some implementations. The system 200 can include an application 205, an information resource 210, an application launch detection module 225, a request generation module 230, a local cache management module 235, and a content item management module 240. In some implementations, the application launch detection module 225, the request generation module 230, the local cache management module 235, and the content item management module 240 can be modules within a prefetching script 220. In some implementations, the prefetching script 220 including the application launch detection module 225, the request generation module 230, the local cache management module 235, and the content item management module 240 can be modules within a content management module 215. The content management module 215 can be a module within the application 205 that can be dedicated to scripts, modules, sub-modules, or the like supplied by the data processing system 110 for executing instructions in the application 205 to cause the client device 125 to perform operations, as described herein.

In some implementations, the prefetching script 220 of the client device 125 is provided by the script provider module 140 of the data processing system 110. The prefetching script 220 can be provided to the client device 125 in response to a request for content received from the client device 125 by the data processing system 110. In some implementations, the data processing system 110 determines whether the client device 125 includes the prefetching script 220. For example, the data processing system 110 can perform a lookup of an identifier of the client device 125 included in the request for content at a data structure (e.g., a table) stored at the data processing system 110. As another example, the data processing system 110 can detect or scan for a flag or other indicator included in a request for content that indicates whether the prefetching script 220 is present at the client device 125.

The prefetching script 220 can be run or otherwise be executed by one or more processors of a computing device, such as those described below in FIG. 6. In some implementations, any of the application launch detection module 225, the request generation module 230, the local cache management module 235, and the content item management module 240 can be part of the application 205, content management module 215, information resource 210 or the prefetching script 220.

The application 205 can include, for example, an Internet browser, mobile application, gaming application, GPS application, or any other computer program capable of executing or otherwise invoking computer-executable instructions, such as the computer-executable instructions included in the information resource 210, the application launch detection module 225, the request generation module 230, the local cache management module 235, and the content item management module 240. The application 205 can obtain or receive the information resource 210 from a server hosting the information resource, such as a server of the content publisher 120, a server of the content provider 115, or a server of the data processing system 110. For instance, the application 205 can send a request including an address or an identifier of the information resource 210 to the server and, in response, receive the information resource 210. In some implementations, the application 205 can include a native application of a content publisher executing on client device. The information resource 210 can include one or more content portions (or content elements). The information resource 210 can specify the positions of the one or more content elements. In some implementations, the information resource 210 can include portions for primary content and portions for third-party content or content items.

Referring now to FIGS. 1 and 2 together, in some implementations, the application launch detection module 225 executing in the application 205 on the client device 125 can cause the client device 125 to transmit an indication to the data processing system 110 that the application 205 has launched on the client device 125. In some implementations, the prefetching script 220 can include instructions that cause the application 205 to execute a routine upon launch of the application 205. The routine can include a set of instructions that provide an indication to the application launch detection module 225 that the application 205 has launched. Accordingly, in turn, the application launch detection module 225 can cause the client device 125 to transmit the indication to the data processing system 110 that the application 205 has launched.

In some implementations, the request generation module 230 executing on the client device 125 can cause the client device 125 to generate a request for content to be transmitted to the data processing system 110. In some implementations, the local cache management module 235 executing on the client device 125 can cause the client device 125 to generate, delete, modify, or otherwise maintain one or more local caches 245a, 245b, 245c associated with the application 205. The local caches 245a, 245b, 245c can be configured to store, local to the client device 125, one or more content items retrieved from the data processing system 110.

In some implementations, the local cache management module 235 executing on the client device 125 can cause the client device 125 to create the local cache 245a associated with the application 205. The local cache 245a can be a storage element at the client device 125 allocated for use in connection with the application 205, and configured to store (e.g., temporarily) one or more content items received from the data processing system 110. In some implementations, the local cache 245a is created in response to a request for content by the application to the data processing system 110. The local cache management module 235 can cause the client device 125 to create the local cache 245a by executing a routine so that the local cache 245a can be created in a memory element of the client device 125. The routine can instruct an operating system of the client device 125 to create the local cache 245a. For example, the cache management module 235 can cause the client device 125 to allocate a predetermined amount of memory for the local cache 245a. The predetermined amount of memory can be designated by the local cache management module 235, and can be adjusted by the data processing system 110 via periodic updates to the code of the prefetching script 220. In some implementations, the local cache management module 235 can cause the client device 125 to vary the configurations of each created local cache depending on parameters at the time of creation. For example, if the local cache 245a is to store content items that are video, the local cache management module 235 can cause the client device 125 to allocate more memory to the local cache 245a than if the local cache 245a were to store static images.

In response to causing the client device 125 to create the local cache 245a, the client device 125 can send information to the local cache management module 235 indicating a local location of the created local cache 245a, so that the application 205 can subsequently access the local cache 245a. In some implementations, the local cache 245a is persistent such that when the application 205 is shut down, the local cache 245a and content stored therein is maintained in the memory element allocated for the local cache 245a by the client device 125.

Accordingly, the local cache management module 235 executing on the client device 125 can cause the client device 125 to assign a configuration to the local cache 245a based on parameters associated with the request for content. For example, upon generating a request for content including one or more parameters (e.g., a value of a content slot ID), the local cache management module 235 can cause the client device 125 to build and configure a cache based on the parameters of the request (e.g., a local cache that has a configuration including the value of the content slot ID such that subsequent received content items that include the content slot ID can be stored in the local cache configured with the same content slot ID).

The configuration of the local cache 245a can determine the type and classification of content that is to be stored in the local cache 245a for subsequent display by the application 205. For example, if a request for content includes an identifier of a particular content slot, in which a content item is displayed by the application 205, the local cache management module 235 can cause the client device 125 to create a local cache corresponding to the particular content slot identified in the request for content. As such, when the particular content slot is subsequently detected by the application 205, the content item management module 240 can cause the client device 125 to access a content item stored in the local cache corresponding to the particular content slot and retrieve a prefetched content item to be displayed in the particular content slot. Accordingly, the application 205 can be associated with a plurality of local caches (e.g., local caches 245a, 245b, and 245c), with each local cache including different configurations controlling the type of content to be stored in the local caches (e.g., different content slot identifiers of the application 205 can be the different configurations for different local caches). For example, a first local cache 245a can be configured to store content items to be served in content slots matching a first type of content slot that includes an identifier of a first content slot and a second local cache 245b can be configured to store content items to be served in content slots matching a second type of content slot that includes an identifier of a first content slot, and content items that are compatible with the first content slot are stored in the first local cache and content items that are compatible with the second content slot are stored in the second local cache.

In some implementations, configurations associated with the local cache 245a can be any parameter that is included in a request for content, besides a content slot identifier as discussed above. For example, the configurations can include request parameters such as, but not limited to, a type of network that the client device is connected to (e.g., a cellular network, a WiFi network, or the like), characteristics of the client device 125 (e.g., device settings, type of client device, etc.), keywords or subject matter associated with requests for content (e.g., sports, politics, technology, etc.), a current or past location of the client device 125, textual and visual content of different portions of the applications 205 (e.g., such that content items can be seamlessly integrated into the application at different portions), and so on.

In some implementations, upon creating the local caches 245a, 245b, 245c, the client device 125 can send location information of each of the local caches 245a, 245b, 245c so that the content item management module 240 can cause the client device 125 to access or otherwise manage the local caches 245a, 245b, 245c. For example, the content item management module 240 executing on the client device 125 can cause the client device 125 to retrieve content items from the local caches 245a, 245b, 245c. The content item management module 240 executing on the client device 125 can cause the client device 125 delete content items stored in the local caches 245a, 245b, 245c. The content item management module 240 executing on the client device 125 can cause the client device 125 to determine when to retrieve and display (e.g., in response to detecting a content slot in the application 205).

In some implementations, instead of multiple local caches, the local cache management module 235 and the content item management module 240 can cause the client device 125 to create and manage a single local cache. The content item management module 240 can cause the client device 125 to access for display one or more content items stored in the single local cache. In some implementations, the single local cache is configured to store a variety of content items irrespective of parameters associated with the content items (e.g., the single local cache is a universal local cache).

In some implementations, the single local cache is configured to store content items based on parameters of a previous request. For example, the single local cache can include a configuration corresponding to parameters of a previous request for content, and the content item management module 240 can cause the client device 125 to delete the single local cache after it retrieves a content item from the single local cache. Accordingly, the local cache management module 235 can subsequently cause the client device 125 to create a new single local cache to replace the previous single local cache based on parameters of a new request for content. As such, local memory at the client device 125 can be conserved by creating and deleting local caches when appropriate.

Further details regarding the application launch detection module 225, the request generation module 230, the local cache management module 235, the content item management module 240, and the local caches 245a, 245b, 245c are presented below.

Figure 3:
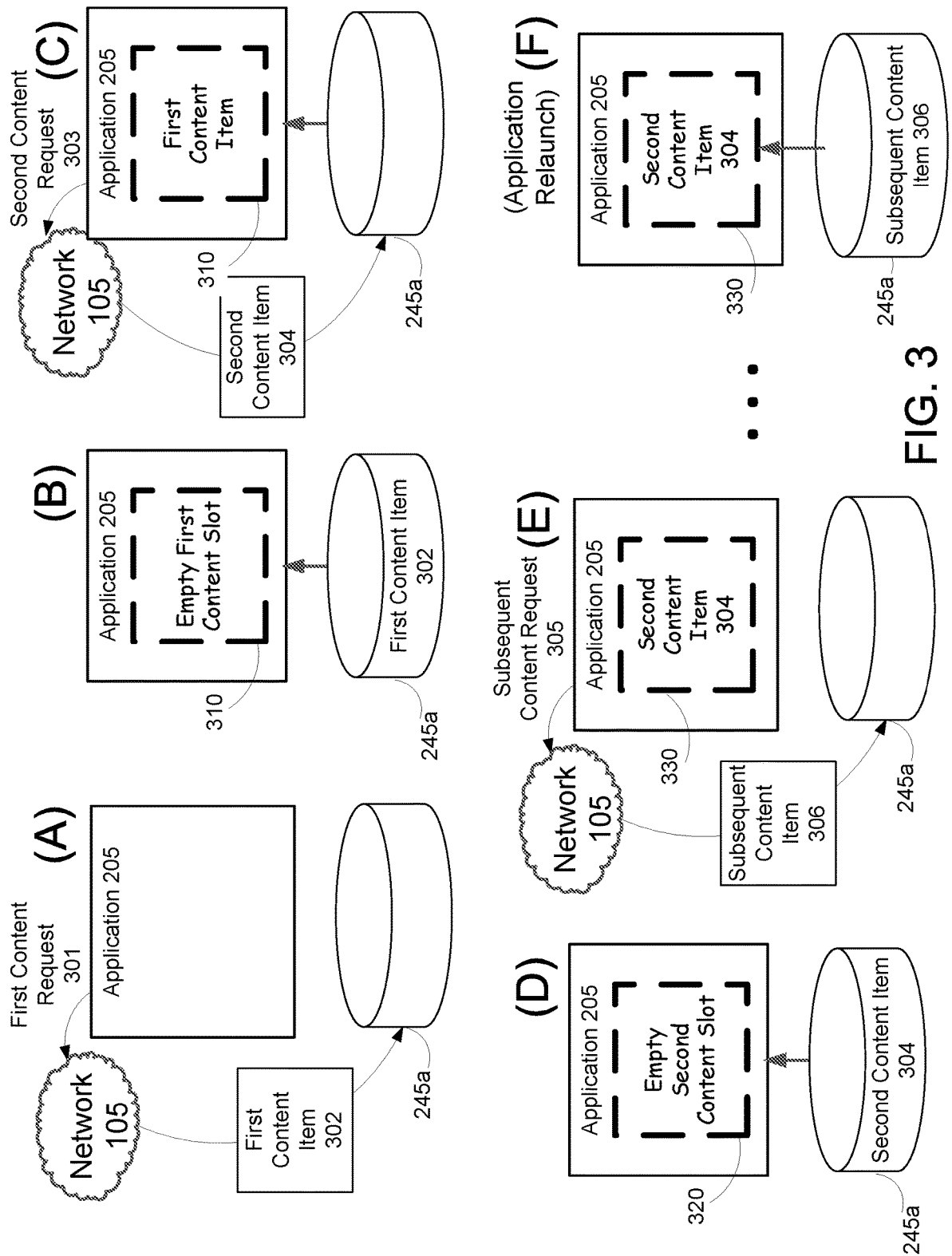
FIG. 3 is a sequence diagram illustrating a process of prefetching content items for display in an information resource at a client device according to some embodiments.

FIG. 3 is a sequence diagram illustrating a process of prefetching content items for display in an information resource at the client device 125 on which the application 205 is executing or running according to some embodiments. The application 205 is illustrated with an associated local cache 245a, and the various states of the application 205 and the local cache 245a are depicted in stages A-F, in response to events as described below.

In some implementations, the application 205 can be launched and running on the client device 125 at stage A. In response to the launching of the application 205, the application launch detection module 225 executing in the application 205 on the client device 125 can cause the client device 125 to transmit an indication that the application 205 has launched on the client device 125. In some implementations, in response to receiving the indication of launch, the content selection module 135 can cause the client device 125 to transmit one or more initial content items to be locally stored at the client device 125 (e.g., in one or more of the local caches 245a, 245b, 245c) for subsequent display in the application 205. In some implementations, the parameters associated with the initial content items can be based on parameters of previous requests made by the application 205 of the client device 125. For example, the parameters associated with an initial content item can correspond to parameters of a final content item request sent by the application 205 before the application 205 was last closed. The parameters associated with the initial content items can be based on other or additional parameters, such as, but not limited to, the type of client device making the request, the type of network serving the client device, the last known location of the client device, the time of day, or the like.

At stage A, the client device 125 can already include the previously created local cache 245a for storing content items. In some implementations, the request generation module 230 executing on the client device 125 can cause the client device 125 to generate and transmit a first request for content 301 to the content request module 130 of the data processing system 110 via the network 105. In some implementations, the first request for content 125 includes one or more parameters indicating a type of content item to be received by the client device 125. The parameters of the first request for content 301 can identify a size of a content slot within which to insert the requested content. The parameters can further identify a type of content associated with the information resource, a type of third-party content requested (e.g., text, image, video, etc.), client device information, size information for requested third-party content item, a network type associated with the client device 125 (e.g., cellular network, WiFi, etc.), an application ID associated with an application at the client device 125, attributes associated with the application ID (e.g., device settings, type of client device, etc.), a current or past location of the client device 125, or a combination thereof.

In response to the first request for content 301, the content selection module 135 of the data processing system 110 uses the parameters received in the first request for content 301 to select a first content item 302 and transmit the first content item 302 to the client device 115. The first content item 302 can then be stored locally at the local cache 245a for subsequent retrieval by the application 205. For example, the application 205 can include instructions configured to cause the client device 125 to receive the first content item 302 and to identify that the first content item 302 matches the first request for content 301 (e.g., by matching a request identifier of the first request for content 301 with a response identifier included in the first content item 302 or by matching a content slot identifier of the first request for content 302 with a content slot identifier included with the first content item 302). For example, in sending the first request for content 301, the request generation module 230 can cause the client device 125 to include in the request, a content slot identifier of a content slot for which the request for content 301 is generated. In turn, the content item management module 240 can cause the client device 125 to determine a content slot identifier of the received first content item 302, and can match the identifier with a configuration of a local cache that is configured for that specific content slot identifier. Once matched, the content item management module 240 can cause the client device 125 to store the received first content item 302 in the local cache having the matching content slot identifier. In some implementations, a response to the request for content that includes a content item that is transmitted to the client device can include some identifying data that the client device or the content item management module 240 can use to determine the local cache in which to store the content item. In some implementations, the client device can be configured to include, in the request for content, a local cache identifier identifying the local cache in which to store the content item. In this way, the data processing system 110 can include the local cache identifier in the response such that the content item management module 240 can route the content item to the local cache corresponding to the local cache identifier for storage. In some implementations, the response can identify the request to which the response corresponds and the content item management module 240 can determine, from the request, the local cache to which the content item should be stored according to a content item management policy.

At stage B, the local cache 245a of the client device 125 stores the first content item 302 for retrieval by the application 205. In some implementations, the local cache 245a is configured to store the first content item 302 for a predetermined duration before the local cache management module 235 executing on the client device 125 causes the client device 125 to delete the first content item 302 in the local cache 245a. In some implementations, the predetermined duration is configurable as desired, and can be, for example, set to 20 minutes. For example, the predetermined duration can be based on a freshness score that the local cache management module 235 executing on the client device 125 causes the client device 125 to attribute to the first content item 302 stored in the local cache 245a. In some implementations, the score can be based on time (e.g., the longer the first content item 302 is stored in the local cache 245a, the lower the freshness score), based on the type of data that the first content item 302 includes, for example, the rate of decrease of a freshness score of a locally cached content item can be different based on the type of data that the first content item 302 includes (e.g., weather information can be allowed relatively more time to be stored in the local cache 245a, while stock price information can allow relatively little time due to the volatile nature of stocks). In some implementation, the local cache management module 235 executing on the client device 125 causes the client device 125 to delete the first content item 302 from the local cache 245a by comparing the freshness score of the first content item 302 to a threshold value stored at the client device 125. For example, if the freshness score is equal to or less than the threshold value, the first content item 302 can be deleted.

In some implementations, the content management module 240 executing on the client device 125 can cause the client device 125 to detect the presence of a first content slot 310 in the application 205. The first content slot 310 can include a location within the display of the application 205 configured to receive a content item to be displayed within the first content slot 310. In response to detection of the first content slot 310, the content management module 240 executing on the client device 125 can cause the client device 125 to retrieve the stored first content item 302 from the local cache 245a and insert the first content item 302 into the first content slot 310 for display by the client device 125. In some implementations, the local cache 245a is configured to include configurations corresponding to the parameters included in the first request for content 301, for example, parameters corresponding to an identifier of the first content slot 310. Accordingly, in some implementations, content items stored in the local cache 245a may be those that are compatible with the first content slot 310 (e.g., those that include a slot identifier matching the identifier of the first content slot 310).

At stage C, in some implementations, the content management module 240 executing on the client device 125 can cause the client device 125 to insert and display the first content item 302 stored in the local cache 245a in the first content slot 310. In some implementations, the content management module 240 executing on the client device 125 can cause the client device 125 to delete the first content item 302 from the local cache 245a at the time of or in response to the first content item 302 being displayed in the first content slot 310. Furthermore, in some implementations, at the time of or in response to the first content item 302 being displayed in the first content slot 310, the content management module 240 executing on the client device 125 can cause the client device 125 to transmit a second or follow-up request for content 303, which may be similar to transmission of the first request for content 301 described above. In some implementations, the second request for content 303 is transmitted in response to display of the first content item 302 at the first content slot 310, instead of, as done conventionally, in response to detection of a content item slot.

In some implementations, the second request for content 303 includes the same or similar parameters to those of the first request for content 301, and therefore a content item received from the data processing system 110 in response to the second request for content 303 may have similar characteristics to the first content item 302 (e.g., similar subject matter, similar visual characteristics, similar sizing, or the like). In some implementations, when the client device 125 transmits the first request for content 301 to the network 105, the client device 125 can store the one or more parameters associated with the first request for content 301 for retrieval when transmitting the second request for content 303 and to be used in connection with the second request for content 303. In some implementations, the one or more parameters of the first request for content 301 can be stored in a separate memory element at the client device 125.

In response to the request, the content management module 240 executing on the client device 125 can cause the client device 125 to receive a second content item 304 (e.g., from the data processing system 110 via the network 105). The second content item 304 is stored in the local cache 245a as a prefetched content item to be retrieved when called for by the application 205. Because the first request for content 301 and the second request for content 303 include the same or similar parameters, the first content item 302 and the second content item 304 may have similar characteristics. For example, both the first content item 302 and the second content item 304 may be compatible with the same content slot (e.g., content slot 310), directed to similar subject matter (e.g., sports, politics, etc.), have a same size, directed to a type of user (e.g., male, older, professional, etc.), combinations thereof, or the like. In some implementations, the parameters of requests for content are based upon textual and visual content of an environment of the display of the application such that first content item 302 and the second content item 304 can seamlessly be integrated into the text and appearance of the same section of the application 205.

In some implementations, the client device 125 can transmit multiple requests for content at once such that multiple content items are stored in the local cache 245a. For example, in response to detecting the first content slot 310, the client device 125 can transmit a plurality of second requests for content 303 to the network 105 and receive corresponding second content items 304 to be stored in the local cache 245a.

Accordingly, the content management module 240 executing on the client device 125 can cause the client device 125 to prefetch a content item for subsequent use by the application 205 such that the prefetched content item can be locally and relatively quickly accessed by the client device 125, as opposed to the client device 125 having to communicate with the data processing system 110 over the network 105 at the time a content item is needed. Therefore, latency in displaying content items in the application 205 can be reduced. Furthermore, relative freshness of content can be maintained despite the prefetching content, for example, because the content item stored in the local cache 245a can have an associated expiration duration (e.g., 20 minutes).

At stage D, the local cache 245a stores the second content item 304 for retrieval by the application 205. In some implementations, the local cache 245a is configured to store the second content item 304 for a predetermined duration before the local cache management module 235 executing on the client device 125 causes the client device 125 to delete the second content item 304 in the local cache 245a. In some implementations, the predetermined duration is configurable as desired, and can be, for example, set to 20 minutes.

In some implementations, the content management module 240 executing on the client device 125 can cause the client device 125 to detect the presence of the second content slot 320 in the application 205. The second content slot 320 can be a different content slot in which the first content item 302 was displayed at stage C. In response to detection of the second content slot 320, the content management module 240 executing on the client device 125 can cause the client device 125 to retrieve the stored second content item 304 from the local cache 245a and insert the second content item 304 into the second content slot 320 for display by the client device 125.

At stage E, in some implementations, the content management module 240 executing on the client device 125 can cause the client device 125 to insert and display the second content item 304 stored in the local cache 245a in the second content slot 320. In some implementations, the content management module 240 executing on the client device 125 can cause the client device 125 to delete the second content item 304 from the local cache 245a at the time of or in response to the second content item 304 being displayed in the second content slot 320. Furthermore, in some implementations, at the time of or in response to the second content item 304 being displayed in the second content slot 320, the content management module 240 executing on the client device 125 can cause the client device 125 to transmit a subsequent request for content 305, which may be similar to transmission of the first request for content 301 and second request for content 303 described above. In some implementations, the subsequent request for content 305 is transmitted in response to display of the second content item 304 at the second content slot 320, instead of, as done conventionally, in response to detection of a content item slot. In some implementations, the subsequent request for content 305 includes the same or similar parameters to those of the second request for content 303, and therefore a content item received from the data processing system 110 in response to the subsequent request for content 305 may be similar to the second content item 304.

In response to the request, the content management module 240 executing on the client device 125 can cause the client device 125 to receive a subsequent content item 306 (e.g., from the data processing system 110 via the network 105). The subsequent content item 306 is stored in the local cache 245a as a prefetched content item to be retrieved when needed by the application 205. Because the second request for content 303 and the subsequent request for content 305 can include the same or similar parameters, the second content item 304 and the subsequent content item 306 may have similar characteristics. For example, both the second content item 304 and the subsequent content item 306 may be compatible with the same content slot (e.g., content slot 310), directed to similar subject matter (e.g., sports, politics, etc.), have a same size, directed to a type of user (e.g., male, older, professional, etc.), combinations thereof, or the like.

In some implementations, stages A-E may repeat until a termination condition is satisfied (e.g., the termination condition can include the application 205 being shut down or deleted, or can include the content fetching feature within the application 205 being disabled). As such, the client device 125 can repeatedly prefetch content based on parameters of a previous request such that new prefetched content can be stored and replaced in local caches corresponding to the parameters at the client device 125. Accordingly, when new content is requested by the application 205, the client device 125 can supply content from local caches as opposed to fetching content via the network 105 in real time after detecting a content slot, thereby reducing latency at the client device 125.

At stage F, the application 205 can be relaunched at any time by a user of the client device 125. In some implementations, the local caches 245a, 245b, 245c are persistent local caches that maintain the content items stored therein even after the application 205 is shut down, closed, or otherwise not in operation. For example, the subsequent content item 306 is received and stored in the local cache 245a at stage E, but the application 205 is closed and relaunched after stage E. However, despite relaunching of the application 205, the client device 125 maintains storage of the subsequent content item 306 in the local cache 245a such that the subsequent content item 306 can be accessed and displayed in response to detection of the content slot 310 in the application 205. Accordingly, in some implementations, the above described method and system of prefetching content can resume (e.g., can revert back to stage A).

Figure 4:
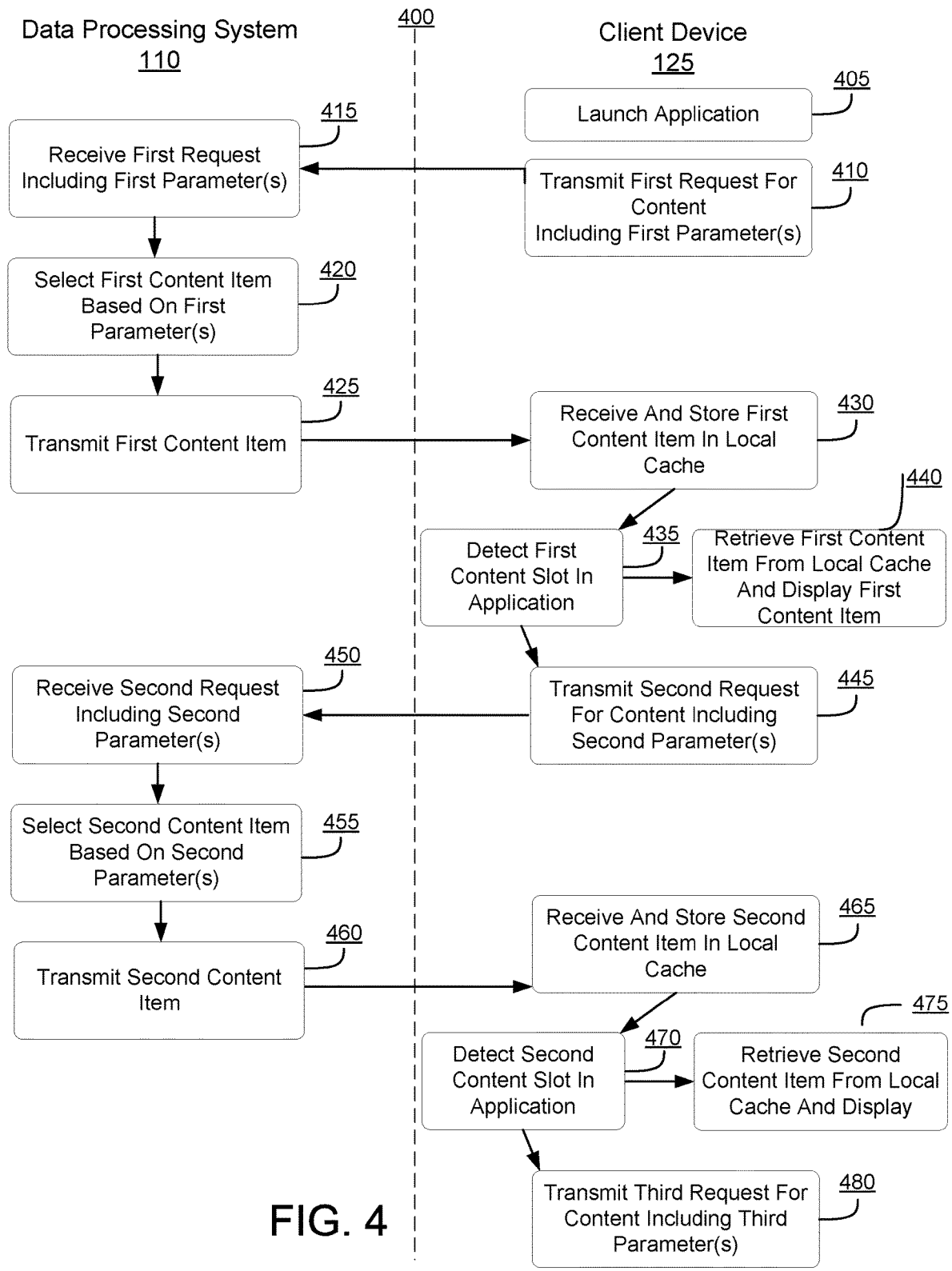
FIG. 4 is a flow diagram depicting a method for prefetching content items for display according to some embodiments.

FIG. 4 is flow diagram depicting a method 400 of prefetching content for display according to some implementations. In brief overview, the method 400 can include a client device launching an application (BLOCK 405). The method 400 can include the client device transmitting a first request for content, the first request including one or more parameters (BLOCK 410) and, in response, a data processing system receiving the first request including the one or more first parameters (BLOCK 415). The method 400 can include the data processing system selecting a first content item based on the first parameter (BLOCK 420). The method 400 can include the data processing system transmitting the first content item to the client device (BLOCK 425), and the client device receiving and storing the first content item in a local cache (BLOCK 430). The method 400 can include the client device detecting a first content slot in an application (BLOCK 435), retrieving the first content item from the local cache and displaying the first content item (BLOCK 440), and transmitting a second request for content including one or more second parameters (BLOCK 445). The method 400 can include the data processing system receiving the second request including the second parameters (BLOCK 450), selecting a second content item based on the second parameters (BLOCK 455), and transmitting the second content item to the client device (BLOCK 460). The method 400 can include the client device receiving and storing the second content item in a local cache (BLOCK 465). The method 400 can include the client device detecting a second content slot in an application (BLOCK 470), retrieving the second content item from the local cache and displaying the second content item (BLOCK 475), and transmitting a third request for content including one or more third parameters (BLOCK 480).

In further detail, the method 400 can include a client device launching an application (BLOCK 405). For example, upon launching the application, an application launch detection module executing on the client device can cause the client device to transmit an indication that the application has launched to the data processing system. In some implementations, in response to receiving the indication of launch, the content selection module can cause the client device to transmit one or more initial content items to be locally stored at the client device (e.g., in one or more of the local caches) for subsequent display in the application. In some implementations, the parameters associated with the initial content items can be based on parameters of previous requests made by the application of the client device. For example, the parameters associated with an initial content item can correspond to parameters of a final content item request sent by the application before the application 205 was last closed. The parameters associated with the initial content items can be based on other or additional parameters, such as, but not limited to, the type of client device making the request, the type of network serving the client device, the last known location of the client device, the time of day, or the like.

The method 400 can include the client device transmitting a first request for content, the first request including one or more parameters (BLOCK 410) and, in response, a data processing system receiving the first request including the one or more first parameters (BLOCK 415). For example, a request generation module executing on the client device can cause the client device to generate and transmit a first request for content to the content request module of the data processing system via the network. In some implementations, the first request for content includes one or more parameters indicating a type of content item to be received by the client device. The parameters of the first request for content can identify a size of a content slot within which to insert the requested content. The parameters can further identify a type of content associated with the information resource, a type of third-party content requested (e.g., text, image, video, etc.), client device information, size information for requested third-party content item, a network type associated with the client device (e.g., cellular network, WiFi, etc.), an application ID associated with an application at the client device, attributes associated with the application ID (e.g., device settings, type of client device, etc.), a current or past location of the client device 125, or a combination thereof.

The method 400 can include the data processing system selecting a first content item based on the first parameter (BLOCK 420). For example, in response to the first request for content, a content selection module of the data processing system uses the parameters received in the first request for content to select a first content item.

The method 400 can include the data processing system transmitting the first content item to the client device (BLOCK 425), and the client device receiving and storing the first content item in a local cache (BLOCK 430). For example, the first content item can then be stored locally at the local cache for subsequent retrieval by the application. For example, the application can include instructions configured to cause the client device to receive the first content item and to identify that the first content item matches the first request for content (e.g., by matching a request identifier of the first request for content with a response identifier included in the first content item or by matching a content slot identifier of the first request for content with a content slot identifier included with the first content item). For example, in sending the first request for content, the request generation module can cause the client device to include in the request a content slot identifier of a content slot that the request for content is for. In turn, the content item management module can cause the client device to determine a content slot identifier of the received first content item, and can match the identifier with a configuration of a local cache that is configured for that specific content slot identifier. Once matched, the content item management module can cause the client device to store the received first content item in the local cache having the matching content slot identifier.

The first content item can be stored locally at a local cache for subsequent retrieval by the client device. In some implementations, the local cache is configured to store the first content item 302 for a predetermined duration before the local cache management module executing on the client device causes the client device to delete the first content item in the local cache. In some implementations, the predetermined duration is configurable as desired, and can be, for example, set to 20 minutes. For example, the predetermined duration can be based on a freshness score that the local cache management module executing on the client device causes the client device to attribute to the first content item stored in the local cache. In some implementations, the score can be based on time (e.g., the longer the first content item is stored in the local cache, the lower the freshness score), based on the type of data that the first content item includes, for example, the rate of decrease of a freshness score of a locally cached content item can be different based on the type of data that the first content item includes (e.g., weather information can be allowed relatively more time to be stored in the local cache, while stock price information can allow relatively little time due to the volatile nature of stocks). In some implementation, the local cache management module executing on the client device causes the client device to delete the first content item from the local cache by comparing the freshness score of the first content item to a threshold value stored at the client device. For example, if the freshness score is equal to or less than the threshold value, the first content item can be deleted.

The method 400 can include the client device detecting a first content slot in an application (BLOCK 435), retrieving the first content item from the local cache and displaying the first content item (BLOCK 440), and transmitting a second request for content including one or more second parameters (BLOCK 445). For example, the content management module executing on the client device can cause the client device to detect the presence of a first content slot in the application. The first content slot can include a location within the display of the application configured to receive a content item to be displayed within the first content slot. In response to detection of the first content slot, the content management module executing on the client device can cause the client device to retrieve the stored first content item from the local cache and insert the first content item into the first content slot for display by the client device. In some implementations, the local cache is configured to include configurations corresponding to the parameters included in the first request for content, for example, parameters corresponding to an identifier of the first content slot. Accordingly, in some implementations, content items stored in the local cache may be those that are compatible with the first content slot (e.g., those that include a slot identifier matching the identifier of the first content slot).

The content management module executing on the client device can cause the client device to insert and display the first content item stored in the local cache in the first content slot. In some implementations, the content management module executing on the client device can cause the client device to delete the first content item from the local cache at the time of or in response to the first content item being displayed in the first content slot. Furthermore, in some implementations, at the time of or in response to the first content item being displayed in the first content slot, the content management module executing on the client device can cause the client device to transmit a second request for content, which may be similar to transmission of the first request for content described above. In some implementations, the second request for content is transmitted in response to display of the first content item at the first content slot, instead of, as done conventionally, in response to detection of a content item slot.

The method 400 can include the data processing system receiving the second request including the second parameters (BLOCK 450), selecting a second content item based on the second parameters (BLOCK 455), and transmitting the second content item to the client device (BLOCK 460). In some implementations, the second request for content includes the same or similar parameters to those of the first request for content, and therefore a content item received from the data processing system in response to the second request for content may have similar characteristics to the first content item (e.g., similar subject matter, similar visual characteristics, similar sizing, or the like). In some implementations, when the client device transmits the first request for content to the network, the client device can store the one or more parameters associated with the first request for content for retrieval when transmitting the second request for content and to be used in connection with the second request for content. In some implementations, the one or more parameters of the first request for content can be stored in a separate memory element at the client device.

The method 400 can include the client device receiving and storing the second content item in a local cache (BLOCK 465). In response to the request, the content management module executing on the client device can cause the client device to receive a second content item (e.g., from the data processing system via the network). The second content item is stored in the local cache as a prefetched content item to be retrieved when called for by the application. Because the first request for content and the second request for content include the same or similar parameters, the first content item and the second content item may have similar characteristics. For example, both the first content item and the second content item may be compatible with the same content slot (e.g., content slot), directed to similar subject matter (e.g., sports, politics, etc.), have a same size, directed to a type of user (e.g., male, older, professional, etc.), combinations thereof, or the like. In some implementations, the parameters of requests for content are based upon textual and visual content of an environment of the display of the application such that first content item and the second content item can seamlessly be integrated into the text and appearance of the same section of the application.

The method 400 can include the client device detecting a second content slot in an application (BLOCK 470), retrieving the second content item from the local cache and displaying the second content item (BLOCK 475), and transmitting a third request for content including one or more third parameters (BLOCK 480). Accordingly, the method 400 can continue the process of prefetching content items and locally storing the content items for display at the client device until a termination condition is met.

As such, the method 400 provides prefetching a content item for subsequent use by the client device such that the prefetched content item can be locally and relatively quickly accessed by the client device, as opposed to the client device having to communicate with the data processing system over the network at the time a content item is needed. Therefore, latency in displaying content items at the client device can be reduced. Furthermore, relative freshness of content can be maintained despite the prefetching of the content, for example, because the content item stored in the local cache can have an associated expiration duration (e.g., 20 minutes) before being deleted.

Figure 5:
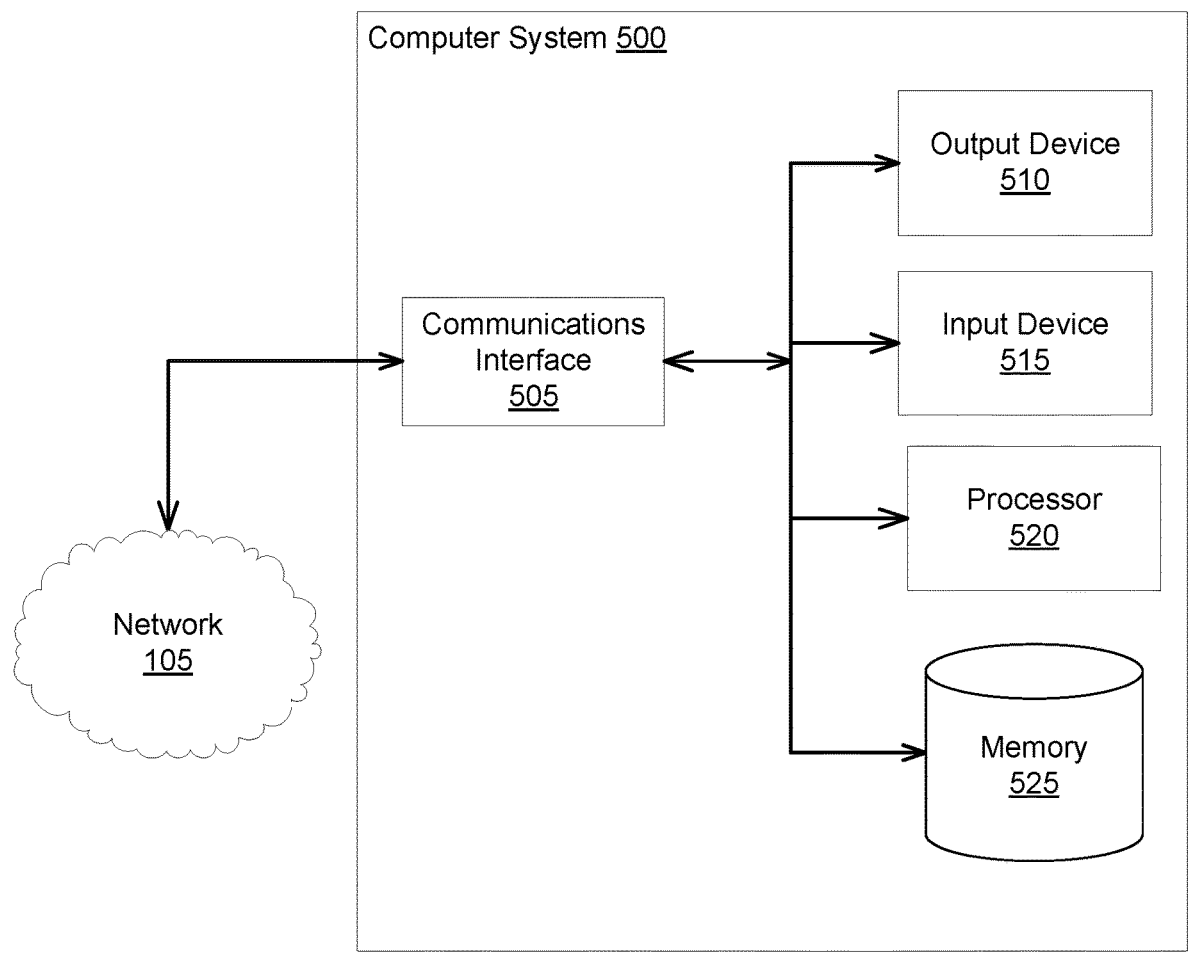
FIG. 5 is a block diagram depicting an illustrative example of a general architecture for a computer system that may be employed to implement elements of the systems and methods described and illustrated herein.

FIG. 5 shows the general architecture of an illustrative computer system 500 that may be employed to implement any of the computer systems discussed herein (including the system 110 and its components such as the content request module 130, the content selection module 135, and script provider module 140 or the client device 125) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 110 such as the content request module 130 and the content selection module 135.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 525 to store information related to the availability of inventory of one or more content units, reservations of one or more content units, among others. The memory 525 can include the database 145. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 500. In some implementations, the communications interface(s) may be configured (e.g., via various hardware components or software components) to provide a website as an access portal to at least some aspects of the computer system 600. Examples of communications interfaces 505 include user interfaces (e.g., web pages), through which the user can communicate with the data processing system 110.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130 and the content selection module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 500 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130 and the content selection module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A method for prefetching dynamically loaded content items for presenting by client applications, the method comprising:

providing computer instructions for execution with a client application on client computing devices, the computer instructions when executed by a client computing device cause the client computing device to:

transmit, to a server at a first time instance, a first request for content to present within an environment of the client application, the first request for content comprising a first identifier identifying a first content placement space within the environment of the client application, and the first identifier for use to select content to send to the client computing device;

receive, from the server, a first content item responsive to the first request for content;

store, in one or more memory elements of the client computing device associated with the client application, the first content item in association with the first identifier;

detect, at a second time instance after storing the first content item in the one or more memory elements, an event indicative of presentation of content within the first content placement space;

retrieve, responsive to the detection and using the first identifier, the first content item from the one or more memory elements; and present the first content item at the first content placement space of the environment of the client application.

2. The method of claim 1, wherein the computer instructions when executed by the client computing device further cause the client computing device to:

transmit, to the server at a third time instance, a second request for content to present within the environment of the client application, the second request for content comprising the first identifier identifying the first content placement space within the environment of the client application;

receive, from the server, a second content item responsive to the second request for content; store, in the one or more memory elements of the client computing device associated with the client application, the second content item in association with the first identifier;

detect, at a fourth time instance after storing the second content item in the one or more memory elements, an event indicative of presentation of content within a second content placement space of the environment of the client application;

retrieve, responsive to the detection and using the first identifier, the second content item from the one or more memory elements; and present the second content item at the second content placement space of the environment of the client application.

3. The method of claim 1, wherein the computer instructions when executed by the client computing device further cause the client computing device to:

transmit, to the server at a third time instance, a second request for content to present within the environment of the client application, the second request for content comprising a second identifier identifying a second content placement space within the environment of the client application, and the second identifier for use to select content to send to the client computing device;

receive, from the server, a second content item responsive to the second request for content;

store, in the one or more memory elements of the client computing device associated with the client application, the second content item in association with the second identifier;

detect, at a fourth time instance after storing the second content item in the one or more memory elements, an event indicative of presentation of content within the second content placement space of the environment of the client application;

retrieve, responsive to the detection and using the second identifier, the second content item from the one or more memory elements; and present the second content item at the second content placement space of the environment of the client application.

4. The method of claim 1, wherein the first identifier is indicative of a type of content items for presenting at the first content placement space of the environment of the client application.

5. The method of claim 1, wherein the first identifier is indicative of a size of requested content.

6. The method of claim 1, wherein the computer instructions when executed by the client computing device further cause the client computing device to:

store each content item received from the server for a maximum predefined time duration.

7. The method of claim 1, wherein the computer instructions when executed by the client computing device further cause the client computing device to:

delete the first content item from the one or more memory elements upon presentation of the first content item at the first content placement space of the environment of the client application.

8. The method of claim 1, wherein detecting the event indicative of presentation of content within the first content placement space includes detecting navigation by the client computing device within the environment of the client application.

9. The method of claim 1, wherein the first content item is an interstitial content item.

10. A system for prefetching dynamically loaded content items for presenting by client applications executed on client computing devices, comprising:

one or more processors; and a memory coupled to the one or more processors, the one or more processors configured to:

provide computer instructions for execution with a client application on client computing devices, the computer instructions when executed by a client computing device cause the client computing device to:

transmit, to a server at a first time instance, a first request for content to present within an environment of the client application, the first request for content comprising a first identifier associated with a first content placement space within the environment of the client application, and the first identifier for use to select content to send to the client computing device;

receive, from the server, a first content item responsive to the first request for content;

store, in one or more memory elements of the client computing device associated with the client application, the first content item in association with the first identifier;

detect, at a second time instance after storing the first content item in the one or more memory elements, an event indicative of presentation of content within the first content placement space;

retrieve, responsive to the detection and using the first identifier, the first content item from the one or more memory elements; and present the first content item at the first content placement space of the environment of the client application.

11. The system of claim 10, wherein the computer instructions when executed by the client computing device further cause the client computing device to:

transmit, to the server at a third time instance, a second request for content to present within the environment of the client application, the second request for content comprising the first identifier identifying the first content placement space within the environment of the client application;

receive, from the server, a second content item responsive to the second request for content;

store, in the one or more memory elements of the client computing device associated with the client application, the second content item in association with the first identifier;

detect, at a fourth time instance after storing the second content item in the one or more memory elements, an event indicative of presentation of content within a second content placement space of the environment of the client application;

retrieve, responsive to the detection and using the first identifier, the second content item from the one or more memory elements; and present the second content item at the second content placement space of the environment of the client application.

12. The system of claim 10, wherein the computer instructions when executed by the client computing device further cause the client computing device to:

transmit, to the server at a third time instance, a second request for content to present within the environment of the client application, the second request for content comprising a second identifier identifying a second content placement space within the environment of the client application, and the second identifier for use to select content to send to the client computing device;

receive, from the server, a second content item responsive to the second request for content;

store, in the one or more memory elements of the client computing device associated with the client application, the second content item in association with the second identifier;

detect, at a fourth time instance after storing the second content item in the one or more memory elements, an event indicative of presentation of content within the second content placement space of the environment of the client application;

retrieve, responsive to the detection and using the second identifier, the second content item from the one or more memory elements; and present the second content item at the second content placement space of the environment of the client application.

13. The system of claim 10, wherein the first identifier is indicative of a type of content items for presentation at the first content placement space of the environment of the client application.

14. The system of claim 10, wherein the first identifier is indicative of a size of requested content.

15. The system of claim 10, wherein the computer instructions when executed by the client computing device further cause the client computing device to:

store each content item received from the server for a maximum predefined time duration.

16. The system of claim 10, wherein the computer instructions when executed by the client computing device further cause the client computing device to: delete the first content item from the one or more memory elements upon presentation of the first content item at the first content placement space of the environment of the client application.

17. The system of claim 10, wherein detecting the event indicative of presentation of content within the first content placement space includes detecting navigation by the client device within the environment of the client application.

18. The system of claim 10, wherein the first content item is an interstitial content item.

19. A non-transitory computer-readable medium storing computer instructions for execution with a client application on client computing devices, the computer instructions when executed by a client computing device cause the client computing device to:

transmit, to a server at a first time instance, a first request for content to present within an environment of the client application, the first request for content comprising a first identifier identifying a first content placement space within the environment of the client application, and the first identifier for use to select content to send to the client computing device;

receive, from the server, a first content item responsive to the first request for content;

store, in one or more memory elements of the client computing device associated with the client application, the first content item in association with the first identifier;

detect, at a second time instance after storing the first content item in the one or more memory elements, an event indicative of presentation of content within the first content placement space;

retrieve, responsive to the detection and using the first identifier, the first content item from the one or more memory elements; and present the first content item at the first content placement space of the environment of the client application.

20. The non-transitory computer-readable medium of claim 19, wherein the computer instructions when executed by the client computing device further cause the client computing device to:

transmit, to the server at a third time instance, a second request for content to present within the environment of the client application, the second request for content comprising the first identifier identifying the first content placement space within the environment of the client application;

receive, from the server, a second content item responsive to the second request for content;

store, in the one or more memory elements of the client computing device associated with the client application, the second content item in association with the first identifier;

detect, at a fourth time instance after storing the second content item in the one or more memory elements, an event indicative of presentation of content within a second content placement space of the environment of the client application;

retrieve, responsive to the detection and using the first identifier, the second content item from the one or more memory elements; and present the second content item at the second content placement space of the environment of the client application.

* * * * *